United States Patent
Donazzi et al.

(10) Patent No.: US 7,622,669 B2
(45) Date of Patent: *Nov. 24, 2009

(54) METHOD FOR SHIELDING THE MAGNETIC FIELD GENERATED BY AN ELECTRICAL POWER TRANSMISSION LINE AND ELECTRICAL POWER TRANSMISSION LINE SO SHIELDED

(75) Inventors: Fabrizio Donazzi, Milan (IT); Sergio Belli, Milan (IT); Paolo Maioli, Milan (IT); Enrico Borghi, Milan (IT)

(73) Assignee: Prysmian Cavi E Sistemi Energia S.R.L., Milan (IT)

( * ) Notice: Subject to any disclaimer, the term of this patent is extended or adjusted under 35 U.S.C. 154(b) by 176 days.

This patent is subject to a terminal disclaimer.

(21) Appl. No.: 10/565,938

(22) PCT Filed: Jul. 30, 2003

(86) PCT No.: PCT/IT03/00476

§ 371 (c)(1),
(2), (4) Date: Jul. 7, 2006

(87) PCT Pub. No.: WO2005/013450

PCT Pub. Date: Feb. 10, 2005

(65) Prior Publication Data

US 2007/0144754 A1    Jun. 28, 2007

(51) Int. Cl.
*H01B 11/06* (2006.01)
(52) U.S. Cl. .......................... 174/36; 174/92
(58) Field of Classification Search ............ 174/36, 174/377, 382, 92; 333/12; 336/92
See application file for complete search history.

(56) References Cited

U.S. PATENT DOCUMENTS 3,222,449 A * 12/1965 Garwin et al. ............. 174/377
3,504,097 A    3/1970 Carlson (Continued)

FOREIGN PATENT DOCUMENTS

DE    27 10 620    9/1978

(Continued)

OTHER PUBLICATIONS

Endo; "Device for Preventing Leakage of Electromagnetic Wave"; Patent Abstracts of Japan of JP-2002261487; Sep. 13, 2002.

(Continued)

*Primary Examiner*—Chau N Nguyen
(74) *Attorney, Agent, or Firm*—Finnegan, Henderson, Farabow, Garrett & Dunner, L.L.P.

(57) ABSTRACT

A method for shielding the magnetic field generated by an electrical power transmission line and an electrical power transmission line so shielded. The electrical power transmission line has at least one electrical cable and at least one shielding element made of ferromagnetic material arranged in a radially outer position with respect to the at least one cable which shielding element has a base and a cover. The line also has a supporting element coupled to at least the base of the shielding element. In particular, the ferromagnetic material of the shielding element is selected from grain oriented silicon steel, preferably containing a silicon content between about 1% and about 5%, non-grain oriented silicon steel, Permalloyè and Supermalloyè.

36 Claims, 8 Drawing Sheets

U.S. PATENT DOCUMENTS

| | | | |
|---|---|---|---|
| 4,447,795 A * | 5/1984 | Sefko et al. | 336/178 |
| 4,639,544 A | 1/1987 | Dableh et al. | |
| 5,709,249 A * | 1/1998 | Okada et al. | 138/162 |
| 6,268,787 B1 * | 7/2001 | Onizuka | 336/92 |
| 2006/0104010 A1 * | 5/2006 | Donazzi et al. | 361/600 |

FOREIGN PATENT DOCUMENTS

| | | |
|---|---|---|
| EP | 0 606 884 A1 | 7/1994 |
| JP | 7-322459 | 12/1995 |
| JP | 8-331729 | 12/1996 |
| JP | 2001-231161 | 9/2002 |
| JP | 2002-261487 | 9/2002 |
| WO | WO-01/93394 A1 | 12/2001 |
| WO | WO-03/003382 A1 | 1/2003 |

OTHER PUBLICATIONS

Tanabe; "Magnetic Shielding Direct-Current Power Facility"; Patent Abstracts of Japan of JP-2001231161; Aug. 24, 2001.

Saito; "Pipe for Magnetic Shield"; Patent Abstracts of Japan of JP-10117083; May 6, 1998.

P. Argaut et al.; "Shielding Technique to Reduce Magnetic Fields From Buried Cables", A10.5, Jicable '99, pp. 331-338, (1999).

A. Goldman; "Handbook of Modern Ferromagnetic Materials", Kluwer Academic Publishers, pp. 115-122, (1999).

Nobuhiro, English-language Abstract of JP 7-322459, dated Dec. 8, 1995 (1 page).

Shuji, English-language Abstract of JP 8-331729, dated Dec. 13, 1996 (1 page).

* cited by examiner

METHOD FOR SHIELDING THE MAGNETIC FIELD GENERATED BY AN ELECTRICAL POWER TRANSMISSION LINE AND ELECTRICAL POWER TRANSMISSION LINE SO SHIELDED

CROSS REFERENCE TO RELATED APPLICATION

This application is a national phase application based on PCT/IT2003/000476, filed Jul. 30, 2003, the content of which is incorporated herein by reference.

FIELD OF THE INVENTION

The present invention relates to a method for shielding the magnetic field generated by an electrical power transmission line and to an electrical power transmission line so shielded.

DESCRIPTION OF THE RELATED ART

Generally, an electrical power transmission line operates at medium voltage (typically from 10 to 60 kV) or at high voltage (typically greater than 60 kV) and at currents of the order of hundreds-thousands of amperes (typically from 500 to 2000 A). The electrical power carried by these lines can reach values of the order of hundreds of MVA, typically 400 MVA. Normally, the carried current is an alternating current at low frequency, in other words generally below 400 Hz and typically equal to 50 or 60 Hz. In general, the electrical power transmission lines are used for transmitting power from electrical power stations to urban centres, over distances of the order of tens of kilometres (normally 10-100 km).

Typically, electrical power transmission lines are three-phase lines comprising three cables arranged in a trench at a depth of 1-1.5 m. In the space immediately surrounding the cables, the magnetic induction H may reach relatively high values and, at ground level (i.e. at a distance of 1-1.5 m from the line), a magnetic induction having a value comprised between 20 and 60 µT may be detected, depending on the geometrical arrangement of the cables and on the intensity of the carried current.

There are circumstances in which it is particularly recommended to minimize the intensity of the magnetic field, both to protect the human body from exposure to alternating magnetic fields of the above-mentioned intensity, in particular with reference to subjects with the highest potential risk, such as children, and to avoid potential interferences with particularly sensitive or delicate electrical equipment, typically in the proximity of hospitals and airports.

In order to avoid possible biological effects and/or interference phenomena with electrical equipment due to exposure to magnetic fields generated by low-frequency sources (for example equal to 50 Hz), there is therefore the need of "mitigating" the magnetic field generated by the cables for the transmission of the electrical current.

In the present description and in the following claims, the expression "mitigation of the magnetic field" is used to indicate the reduction of the effective value of the magnetic field measured in a given position of a factor of about 10 to about 100 with respect to the value of the magnetic field which would be measured in the same position in the absence of shielding application.

More in particular, with reference to cables placed underground, in the present description and in the following claims, the expression "measurement of the magnetic field" is used to indicate the measurement of the magnetic field performed at ground level at nominal current.

As is known, when electrical cables are laid into shielded conduits the magnetic field generated by the cables can be mitigated.

The article by P. Argaut, J. Y. Daurelle, F. Protat, K. Savina, and C. A. Wallaert "Shielding technique to reduce magnetic fields from buried cables" A 10.5, JICABLE 1999, considers and compares the shielding effect provided by an open-section shield, such as a sheet of ferromagnetic material, placed above the cables, and the effect provided by a closed-section shield, such as a conduit of rectangular cross-section made of ferromagnetic material placed around the cables. According to this article, attenuation factors of about 5-7 can be obtained with open-section shields, attenuation factors of about 15-20 can be obtained with closed-section shields and attenuation factors of about 30-50 can be obtained when the closed-section shield is provided very close to the cables, for example in the form of a ferromagnetic tape wound directly around the cables.

These shields have a number of disadvantages which have not been overcome yet. Firstly, such shields need to be sensibly thick (1-10 mm) in order to provide a sufficiently effective shielding action, with negative consequences on the total weight of the transmission line, on the simplicity and on the rapidity of the installation and maintenance operations and, last but not least, on the cost of the line and of the maintenance thereof.

Secondly, although the closed-section conduits described above provide the best shielding effects of the magnetic field, the Applicant noted that the installation and maintenance of the cables into closed conduits is a difficult and costly operation since the cables need to be inserted into the conduits and, in case of maintenance, the cables cannot be inspected because they are surrounded by the conduit.

Thirdly, the prior art shields, whether open-section or closed-section shields, are subject to unacceptable electrical losses (i.e. due to eddy currents) and/or hysteretic losses. The hysteretic losses cause the overheating and reduce, in this way, the electrical power transmission capacity through the cable.

A further example of closed-section shielding conduits is described in patent application WO 01/93394 of the Applicant, which describes the shielding of electrical power transmission cables by means of conduits comprising at least one layer of ferromagnetic material. In order to ensure an effective magnetic field shielding action, the thickness of the shield is quite high (in the order of 10 mm), which implies an increase of the weight of the transmission line and an ensuing increased difficulty in cable laying operations, which are already quite difficult due to the closed geometry of the conduit.

A further example of closed-section shielding conduits is described in patent application WO 03/003382 of the Applicant. In particular, this document describes a conduit supporting two shielding layers, a first radially inner layer made of a first ferromagnetic material, and a second radially outer layer made of a second ferromagnetic material having a relative magnetic permeability greater than the relative magnetic permeability of the first ferromagnetic material. Also in this case, the closed section of the conduit makes the cable laying operations complicated.

Patent application (Kokai) JP 10-117083 describes a further example of shielding of the magnetic field generated by an electrical cable of an electrical power transmission line, essentially consisting of a tube made of ferromagnetic material within which the electrical power transmission line cables are laid. More in particular, such tube is manufactured by spirally winding a tape made of ferromagnetic material on a tubular support, such as for example a tube of resin or metal within which the cables are laid. Such spirally winding can be carried out in a single step to form a single shielding layer, or in a plurality of steps to form a respective plurality of superimposed shielding layers constituted by the same shielding material.

In the example described, the tape is constituted by grain oriented steel having a greater magnetic permeability in a direction parallel to the winding direction with respect to the magnetic permeability in a direction perpendicular to the above-mentioned winding direction.

In the present direction and in the following claims, the expression "grain oriented material" is used to indicate a material in which the crystalline domains have a preferential alignment direction and an extended dimension in the direction of alignment of the crystalline domains, as described, for example, by Alex Goldman in "Handbook of modern ferromagnetic materials", pages 119-120, Kluwer Academic Publishers, 1999.

Said alignment can be evaluated by means of known methods, such as for example by means of an optical microscope or by X-ray diffractometry, and can be carried out by means of rolling processes and thermal annealing treatments according to predetermined times and temperatures and in the presence of recrystallization inhibitors, as described, for example, in document EP-A-0 606 884.

Although substantially achieving the purpose, the shielding method described in document JP 10-117083 involves a step or a plurality of steps of spirally winding a single tape or a plurality of tapes made of ferromagnetic material, which makes the manufacture of the line rather laborious, with negative effects on the time and costs required for manufacturing and laying the line. The optimum shielding effect of the magnetic field is achieved at a null angle between the direction of action of the magnetic field generated by the cable and the rolling direction of the ferromagnetic material, which constitutes the preferential magnetization axis. However, the choice of said null angle is incompatible with a shielding spirally wound around the cable as described in document JP 10-117083, whereby the above-mentioned angle must be necessarily greater than 0°, with ensuing lack of exploitation of the maximum shielding effect. On the other hand, the dependence of such angle on the preferential magnetization axis depends very strongly on the intensity of the magnetic field, whereby the appropriate angle must be elected each time as a function of the intensity of the magnetic field, resulting in a poor applicative flexibility of the line and in a further complication of the installation operations of the line.

Finally, at the regions where adjacent portions of tape wound in a spiral manner overlap, the magnetic shielding effect is ineffective because of the unavoidable presence of defects, such as for example lack of homogeneity and undulations of the contacting surfaces of the tape wound in a spiral manner. Since the tape has a limited width (in the order of a few centimetres), in fact, the tape is not able to limit the effect of leakage of the magnetic field due to the presence of these defects.

In order to overcome the drawbacks of the prior art described above, the Applicant has identified the need of providing an electrical power transmission line comprising at least one electrical cable and at least one shielding element for shielding the magnetic field generated by such cable, which is easy to be installed and which has a limited weight, while allowing to achieve an effective mitigation action of the magnetic field. Moreover, the Applicant has identified the need of providing a method for shielding the magnetic field of such a line which is easier to be carried out and less costly, especially in terms of time required for installing the line with respect to the prior art methods.

SUMMARY OF THE INVENTION

The Applicant has found that it is possible to manufacture an electrical power transmission line which is easy to be installed by providing a shielding element comprising two components, in particular a base and a cover, while obtaining an effective mitigation action of the magnetic field, without resulting in an excessive weight of the shielding element, thanks to the coupling of at least one shielding element to at least one supporting element to which the function of mechanically supporting the shielding element is given.

According to a first aspect thereof, the present invention therefore refers to an electrical power transmission line comprising:
  at least one electrical cable;
  at least one shielding element made of at least one ferromagnetic material arranged in a radially outer position with respect to said at least one cable for shielding the magnetic field generated by said cable, said at least one shielding element comprising a base and a cover, and
  at least one supporting element coupled to at least said base of the shielding element.

The use of a shielding element arranged in a radially outer position with respect to the cable and comprising at least two separate components, in particular a base and a cover, allows to mitigate the magnetic field in a satisfactory manner, while ensuring a simplification of the installation and laying procedure of the line, as well as of the subsequent maintenance operations of the same, whereas the provision of at least one supporting element coupled at least to the base allows to optimize the thickness of the shielding element, thus reducing the weight of the latter, with a further advantageous simplification and rapidity of the installation procedure.

Thanks to the presence of a shielding element comprising two components, in fact, subsequently to the positioning of the base, preferably in a trench, the cables are laid into the base and the cover is then leaned onto the base to substantially complete the shielding element. The use of shielding elements comprising two components therefore allows to use greater laying lengths and to realize winding paths and all those paths which normally make difficult the laying of the cable(s) into closed shielding elements constituted by a single component. Moreover, the shielding elements comprising two components allow the inspection of the cables both during the laying of the line and subsequently, when the line is in use.

In the electrical power transmission line according to the present invention, therefore, the best shielding effects of the magnetic field ensured by the closed-section shielding elements, to which the shielding element of the present invention can be assimilated, are advantageously exploited, while overcoming the drawbacks posed by the closed-section shielding elements of the prior art in terms of difficulty of installation and maintenance.

By selecting, in fact, a ferromagnetic material which is effective in terms of mitigation action of the magnetic field as material for the shielding element and by selecting a material having suitable mechanical properties as material for the supporting element, it is advantageously possible to limit the thickness of the shielding element to a considerable extent, giving the function of support and mechanical resistance to the supporting element alone.

Finally, differently from to the electrical power transmission lines of the prior art, in which the shielding is obtained by spirally winding a tape made of ferromagnetic material around a tubular support, with ensuing unavoidable formation of a non-null angle between the tape helix thus formed and the straight circumferential direction of the action of the magnetic field, in the transmission line according to the present invention such angle is null, with advantageous increase of the magnetic permeability and improvement of the shielding effect.

The transmission line according to the present invention may be placed underground, preferably at 1 to 1.5 metres below the ground level, so as to maximize the mitigation effect of the magnetic field generated by the cable. The transmission line according to this invention may also be placed within the wall constructions of large-scale buildings, in which electrical power is transmitted at medium or high voltage along a main line before being converted into low voltage at each single user point.

According to a preferred embodiment of the electrical power transmission line of the invention, the line comprises three cables, preferably arranged according to a trefoil arrangement. The trefoil arrangement of the cables allows to obtain a mitigation of the magnetic field which is about twice the mitigation of the magnetic field obtainable by three cables arranged side by side on a plane.

In the present description and in the following claims, the expression "trefoil arrangement" is used to indicate an arrangement at which the centres of the three cables occupy the vertices of an equilateral triangle.

More in particular, the trefoil arrangement may be either of the so-called "open" type or of the so-called "closed" type, depending on the fact that there is a reciprocal contact among the cables or not. In other words, in the case of an open type trefoil arrangement, the length of each side of the equilateral triangle at the vertices of which the cables are placed is greater than the diameter of each cable, while, in the case of a closed type trefoil arrangement, the length of each side of the equilateral triangle at the vertices of which the cables are placed is substantially equal to the diameter of each cable.

Although the trefoil arrangement is preferred, and the closed type arrangement is particularly preferred, any other arrangement intended to attenuate the magnetic field is equally possible. In an alternative embodiment, cables may be arranged side by side on a plane, in a base sufficiently wide to contain the cables according to this arrangement. Although this arrangement increases the electrical losses as well as the magnetic field, it may be advantageously applied when a slight mitigation of the magnetic field is required, since an arrangement of this type allows to use a shielding element having a size of lower height, with ensuing advantageous minimization of the weight of the shielding element and, with this, of the transmission line.

In order to obtain an effective mitigation action of the magnetic field, both the base and the cover of the transmission line of the invention are substantially continuous, i.e. the outer surface of said base and of said cover is substantially devoid of any macroscopic interruption.

Preferably, the base comprises a bottom wall, for example substantially flat, and a pair of side walls, for example substantially flat. In such way, the manufacture of the base is advantageously simplified.

Preferably, the side walls of the base extend in a direction substantially perpendicular to the bottom wall.

Preferably, in a trefoil arrangement of the cables of the closed type, the width of the bottom wall is equal to about 2.1 times the diameter of the electrical cables housed within the shielding element.

Preferably, in a trefoil arrangement of the cables of the closed type, the height of the side walls, defining the height of the shielding element, is equal to about 2.2 times the diameter of the electrical cable housed within the shielding element.

The base of the shielding element may have a U-shaped cross-section provided with bevelled corners according to a predetermined bending radius, which advantageously allows to preserve the ferromagnetic characteristics of the material of the shielding element, or a U-shaped cross-section provided with sharp corners. The latter embodiment, although involving a degradation of the ferromagnetic characteristics of the material of the shielding element at said sharp corners, is preferable because such embodiment allows to achieve an attenuation of the magnetic field at ground level of about 25% with respect to the embodiment providing a base with bevelled corners. In this connection, the Applicant has found that the greater length of the curve of the shielding element in the embodiment with bevelled corners exerts a negative effect having a greater role with respect to the degradation effect of the ferromagnetic characteristics due to the bending of the shielding element provided with sharp corners.

In the case of the embodiment with a U-shaped cross-section provided with bevelled corners, the bending radius is preferably equal to about 0.4-0.7 times the diameter of the electrical cables housed within the shielding element.

Preferably, the base of the shielding element further comprises a pair of flanges extending in a predetermined direction from the end portions of the side walls of the base.

Advantageously, in such way a wider supporting base for the cover and an improved closure of the shielding element are provided.

According to a preferred embodiment of the line of the invention, the flanges extend outwardly from the end portions of the side walls of the base.

According to an alternative embodiment of the line of the invention, the flanges extend inwardly from the end portions of the side walls of the base.

Preferably, the flanges extend from the end portions of the side walls of the base in a direction substantially perpendicular to the side walls. Advantageously, in such way, the cover of the shielding element may be leaned onto the shielding element base in a stable manner.

Preferably, the above-mentioned flanges have a width equal to about 25% of the width of the base bottom wall. Preferably, the minimum width of said flanges is equal to about 20 mm.

According to a preferred embodiment, the cover of the shielding element is substantially flat, for example in the form of a rectangular sheet made of ferromagnetic material. Such particularly simplified preferred embodiment advantageously allows to limit the manufacturing costs of the electrical power transmission lines of the invention.

According to a preferred embodiment, the cover is substantially continuous, i.e. the outer surface of said cover is devoid of macroscopic interruptions so as to maximize the mitigation action of the magnetic field.

The above-mentioned possibility of sensibly limiting the thickness of the shielding element of the line of the invention allows to use long shielding elements, for example in the order of about 1 m, while maintaining the shielding element weight within acceptable limits and, in such way, to overcome the insufficient shielding action detected in the regions at which the prior art tapes wound in a spiral manner overlap.

According to a preferred embodiment, the flanges may be provided on the cover instead of on the base. In such a case, the cover comprises a main wall and a pair of flanges extending from the main wall in a predetermined direction, preferably in a direction substantially perpendicular to the main wall.

In this way, it is advantageously ensured an improved closure of the shielding element, and an ensuing improved effectiveness of the shielding action of the magnetic field generated by the transmission line.

According to such embodiment, the corners defined between the main wall of the cover and the flanges may be sharp or bevelled, preferably according to a bending radius equal to about half the outer diameter of the cable or cables housed within the shielding element.

Preferably, the base and the cover of the shielding element comprise walls having a thickness comprised between about 0.10 mm and about 0.60 mm and, still more preferably, comprised between about 0.20 mm and about 0.35 mm.

Such values of thickness advantageously allow to manufacture a transmission line in which the shielding element has an advantageously limited weight, which allows in turn to limit the costs imputable to the use of the ferromagnetic material.

The cover may have a thickness which is lower than the thickness of the base, because the cover, which is positioned farther from the cables with respect to the base, is crossed by a lower magnetic flow with respect to the magnetic flow crossing the base.

As an illustrative example, the cover may have a thickness between about 0.10 and about 0.50 mm and the base may have a thickness between about 0.20 and about 0.60 mm.

Preferably, the base and the cover of the shielding element comprise respective sides reciprocally superimposed for a portion of predetermined length in lateral direction.

In the present direction and in the following claims, the term "sides" of the base or of the cover of the shielding element is used to indicate the lateral portions of the base or, respectively, of the cover, which are opposite with respect to the longitudinal axis of the shielding element.

According to a preferred embodiment of the electrical power transmission line of the invention, a material having a permeability greater than air, such as for example a magnetic rubber, is interposed at the superimposed sides of the base and of the cover. In this way, the gap between the base and the cover at the region in which the cover leans onto the base is substantially closed, with advantageous further attenuation of the magnetic field generated by the cable.

Preferably, the base and the cover of the shielding element comprise respective walls having a rolling direction substantially perpendicular to the axis of the at least one cable.

In this way, an improved shielding effect of the magnetic field is advantageously achieved.

According to an alternative embodiment, the base and the cover of the shielding element comprise respective walls having a rolling direction substantially parallel to the axis of the at least one cable.

According to a preferred embodiment, the shielding element comprises a plurality of shielding modules arranged side by side, each of these shielding modules comprising a modular base and a modular cover.

A configuration of the modular type of the shielding element advantageously facilitates both the installation operations of the electrical power transmission line and the subsequent maintenance operations, in particular the replacement of damaged sections of the shielding element.

Preferably, such shielding modules are longitudinally superimposed for a portion of predetermined length, preferably comprised between 25% and 100% of the width of the shielding element.

Preferably, each modular base has a frustoconical longitudinal section so as to facilitate the partial longitudinal superimposition between adjacent modular bases and to form, in such way, a substantially continuous shielding element. In the case of this embodiment, the modular bases and covers are preferably produced by stamping.

According to an alternative embodiment of the transmission line of the invention, when the shielding modules are not reciprocally superimposed, but just reciprocally arranged side by side, the shielding element further comprises a respective connecting element made of ferromagnetic material for connecting such modules arranged side by side.

In this way, the connecting element has shielding properties substantially analogous to the properties of a substantially continuous shielding element. In the case of the latter embodiment the modular bases and covers may be conveniently manufactured by extrusion, which advantageously results in a reduction in manufacturing costs.

According to a preferred embodiment, in each of said shielding modules, the modular base and the modular cover are reciprocally staggered in longitudinal direction by a predetermined distance, preferably equal to the length of the above-mentioned portion of longitudinal superimposition of the shielding modules.

Preferably, the modular base is coupled to a supporting element.

Preferably, each wall of the modular base is coupled to respective supporting elements.

In this way, supporting elements of limited size and, as such, easily transportable and applicable to the shielding element, are advantageously used.

More preferably, both the modular base and the modular cover are coupled to respective supporting elements.

According to a preferred embodiment of the power transmission line of the invention, at least two adjacent shielding modules extend along different directions, the shielding element further comprising a respective connecting element made of ferromagnetic material for connecting these at least two adjacent modules. In this way, it is advantageously possible to manufacture lines provided with curved sections, elbows and similar sections.

In order to form such curved sections, the modular bases may be shaped in a substantially rectangular form and advantageously produced by extrusion, in which case the curved sections may be laid out by reciprocally angulating at least two adjacent modular bases in such a manner that the adjoining sides of such adjacent bases define a substantially triangular free space therebetween or, alternatively, the modular bases may be shaped in a such a manner that the adjoining sides of such adjacent bases are substantially parallel so as to minimize such free space.

According to a preferred embodiment, the ferromagnetic material of which the at least one shielding element is made has a maximum value of relative magnetic permeability $\mu_{max}$ greater than about 20000.

The use of at least one shielding element made of ferromagnetic material having a maximum value of relative magnetic permeability greater than such numerical value advantageously allows to minimize the magnetic losses unavoidably present in the base and in the cover of the shielding element.

More preferably, the ferromagnetic material has a maximum value of relative magnetic permeability $\mu_{max}$ comprised between about 20000 and about 60000 and, still more preferably, a maximum value of relative magnetic permeability $\mu_{max}$ equal to about 40000, with advantageous further reduction of the magnetic losses.

Moreover, the use of materials having said ferromagnetic characteristics allows to use a more limited thickness of the shielding element with respect to the prior art lines, with advantageous reduction of the line weight.

The electrical power transmission line may comprise two shielding elements, preferably having a controlled magnetic permeability, i.e. preferably reciprocally coupled so as to form a first radially inner layer made of a first ferromagnetic material and a second radially outer layer made of a second ferromagnetic material. Preferably, the first ferromagnetic material has a maximum value of relative magnetic permeability greater than the maximum value of relative magnetic permeability of the second ferromagnetic material.

In the case in which the line comprises two shielding elements having a controlled magnetic permeability, the maximum value of relative magnetic permeability of the radially inner layer is preferably equal to about 40000, and the maximum value of relative magnetic permeability of the material of the radially outer layer is preferably equal to about 3000.

Preferably, the ferromagnetic material is selected from the group comprising: grain oriented silicon steel, non-grain oriented silicon steel, Permalloy®, Supermalloy®. The Permalloy® and the Supermalloy® are nickel-iron-molybdenum alloys having a high nickel content (equal to about 80%), in which the molybdenum content is comprised between 4 and 5% and, respectively, is greater than 5%, both alloys being manufactured by Western Electric Company, Georgia, USA.

Alloys having magnetization curves similar to the magnetization curves of these alloys may also be used.

When silicon steel is used, whether grain oriented or not, thanks to the presence of the silicon, on the one hand the value of the losses determined by the hysteresis cycle present in the ferromagnetic material is advantageously reduced to a considerable extent and, on the other hand, the electrical conductivity of the steel is advantageously reduced, which also allows to reduce the losses due to eddy currents.

Thanks to this double beneficial effect, the power transmission capacity of a line shielded by a shielding element made of silicon steel is advantageously improved.

As an illustrative example, with a current equal to about 400 A, three cables having a diameter of about 100 mm arranged according to a trefoil arrangement of the closed type within a shielding element made of grain oriented silicon steel having a thickness of about 0.27 mm placed about 1.4 m below the ground level, the magnetic field induction is equal to about 0.2 µT at the ground level.

As to the losses due to eddy currents and the losses due to magnetic hysteresis, both losses, at the above-mentioned values of thickness of the shielding element, trench depth and magnetic induction, are equal to about $1.7 \cdot 10^6$ Siemens m and, respectively, equal to about 1.1 W/kg at a magnetization level of about 1.5 T at 50 cycles per second.

Among the different types of grain oriented silicon steels, the steel referred to as M4T27 according to the AST standard is particularly preferred.

According to a preferred embodiment of the power transmission line of the invention, the silicone content is comprised between about 1% and about 5% and, more preferably, between about 3% and about 4%.

Advantageously, within this preferred range of values, the electrical conductivity of the silicon steel is further reduced, allowing in such way a further corresponding reduction of the losses due to eddy currents.

According to a preferred embodiment of the line of the invention, the base and the cover of the shielding element may be made of different materials, preferably using a poorer material, i.e. a material having a lower maximum value of relative magnetic permeability, for the cover, since the latter is crossed by a lower magnetic field flow with respect to the base.

Preferably, the base is made of a first ferromagnetic material having a maximum value of relative magnetic permeability greater than about 40 and the cover is made of a second ferromagnetic material having a maximum value of relative magnetic permeability greater than about 20.

Preferably, the line of the invention, in addition to at least one supporting element coupled to the base of the shielding element, further comprises a supporting element coupled to the cover of the shielding element.

According to a preferred embodiment of the electrical power transmission line of the invention, the above-mentioned at least one supporting element coupled to the base and optionally also to the cover of the shielding element is arranged in a radially outer position with respect to the above-mentioned at least one shielding element. In this way, the mechanical resistance conferred to the cable is advantageously further improved.

According to an alternative embodiment, the at least one supporting element is arranged in a radially inner position with respect to the at least one shielding element. In this way, it is advantageously possible to exploit the presence of the supporting element for supporting, in addition to the shielding element, also a plurality of cables maintained in a desired spatial configuration.

According to an alternative embodiment, the at least one shielding element is interposed between a pair of supporting elements. In this way, the above-mentioned advantages correlated to an improved mechanical resistance and to the possibility of maintaining a plurality of cables in a desired spatial configuration can be simultaneously achieved.

According to a preferred embodiment, the at least one supporting element is substantially flat. In this way, one or more supporting elements may be easily coupled to the base and optionally also to the cover of the shielding element, preferably according to one of the following ways.

According to a first way, the at least one supporting element is firstly coupled to the base and optionally also to the cover of the shielding element by means of glue, and subsequently the at least one supporting element and the shielding element so coupled are shaped according to the desired geometry. For example, the base of the shielding element associated with the respective supporting element may be shaped in the form of a U-shaped cross-section, preferably provided with lateral flanges, by longitudinally hot-bending the base and respective supporting element coupled thereto at four points.

When the cover is provided with a pair of flanges, at least one supporting element, for example in the form of a flat plate, is firstly coupled to the cover, for example in the form of a flat plate as well and, subsequently, the at least one supporting element and the cover so coupled are longitudinally hot-bent at two points.

According to a second way, the at least one supporting element is manufactured by extrusion and coupled to the base of the shielding element, and optionally also to the cover, which are both manufactured by stamping. The coupling may be carried out by means of glue or by means of a plurality of fixing means, described in greater detail in the following, longitudinally arranged at predetermined distances from each other.

According to a third way, both the at least one supporting element and the base and cover of the shielding element are manufactured by stamping and subsequently coupled by means of glue or by means of a plurality of fixing means.

According to an additional way, the base of the shielding element comprises three sheets advantageously manufactured by extrusion, which are coupled, for example by means of glue, to respective walls of a substantially U-shaped supporting element.

According to a preferred embodiment of the power transmission line of the invention, the at least one supporting element comprises a wall having a thickness equal to about 2-10 mm and, still more preferably, equal to about 3-5 mm.

According to a preferred embodiment of the power transmission line of the invention, the at least one supporting element is made of an electrically non-conductive and non-ferromagnetic material.

Preferably, the electrically non-conductive and non-ferromagnetic material of which the at least one supporting element may be made is selected from the group comprising: plastics materials, cement, terracotta, carbon fibres, glass fibres, wood or other materials able to exert an advantageous supporting function while being advantageously produced by means of simple low cost technologies.

Still more preferably, said plastics materials are selected from the group comprising: polyethylene (PE), low-density polyethylene (LPDE), medium-density polyethylene (MPDE), high-density polyethylene (HPDE), linear low-density polyethylene (LLPDE), polypropylene (PP), ethylene/propylene elastomer copolymers (EPM), ethylene/propylene/diene terpolymers (EPDM), natural rubber, butyl rubber, ethylene/vinyl copolymers (such as for example ethylene/vinyl acetate (EVA)), ethylene/acrylate copolymers (such as for example ethylene/methyl acrylate (EMA), ethylene/ethyl acrylate (EEA), ethylene/butyl acrylate (EBA)), ethylene/α-olefin thermoplastic copolymers, polystyrene, acrylonitriletbutadiene/styrene resins (ABS), halogenated polymers (such as for example polyvinyl chloride (PVC)), polyurethane (PUR), polyamides, aromatic polyesters (such as for example polyethylene terephthalate (PET) and polybutylene terephthalate (PBT)).

Alternatively, the supporting element may be made of a ferromagnetic or metallic material. Materials of such type, although causing weak magnetic losses, are advantageous in terms of stampability, thus facilitating the coupling between the supporting element and the shielding element.

Preferably, the shielding element further comprises a plurality of fixing means, such as for example in the form of hooks made for example of a plastics material.

When the at least one supporting element is electrically conductive, or when the same is electrically non-conductive but does not completely cover the portions of the base and the cover intended to be superimposed, the fixing means are preferably made of metal, so as to ensure an electrical continuity between the base and the cover.

Preferably, the fixing means are longitudinally arranged at predetermined distances so as to fix the cover onto the base. The fixing means advantageously allow to improve the coupling stability between the base and the cover of the shielding element.

As an alternative to the hooks, plastic or metal clips or binder spines or other fixing means suitable for this aim may be used.

Preferably, the fixing means are arranged in pairs, wherein each pair comprises fixing elements arranged on opposite sides with respect to the longitudinal axis of the shielding element.

According to a further embodiment, the base and cover may be reciprocally associated, for example by means of a longitudinal hinge, so as to simplify the laying operations and to improve the coupling precision between the two parts.

According to a preferred embodiment of the power transmission line of the invention, the fixing means are arranged in a plurality of pairs positioned along the sides of the shielding element at a predetermined reciprocal distance, preferably comprised between about 20 and about 100 cm.

According to a second aspect thereof, the present invention refers to a method for shielding the magnetic field generated by an electrical power transmission line comprising at least one electrical cable, the method comprising the steps of:
  providing at least one shielding element made of at least one ferromagnetic material for shielding the magnetic field generated by the at least one electrical cable, the shielding element comprising a base and a cover;
  coupling at least one supporting element to at least the above-mentioned base;
  laying the at least one electrical cable into the base of the shielding element; and
  leaning the cover onto the base so as to substantially close the shielding element.

Thanks to these steps, the method according to the invention allows an easy and rapid installation of a shielded electrical power transmission line, particularly in the case in which the line is placed underground. In a similar manner, any maintenance interventions which may be necessary subsequently to the installation are facilitated.

According to a preferred embodiment of the method of the invention, the ferromagnetic material is selected from the group comprising: grain oriented silicon steel, non-grain oriented silicon steel, Permalloy®, Supermalloy®, these last two alloys being manufactured by Western Electric Company.

When the ferromagnetic material is a grain oriented material, the step of providing the shielding element preferably includes the arrangement of the walls of the base and of the cover according to a configuration such that the rolling direction of these is substantially perpendicular to the axis of the at least one cable.

Preferably, the step of providing the shielding element includes the arrangement side by side and the partial superimposition in longitudinal direction of a plurality of shielding modules comprising respective modular bases and modular covers.

According to a preferred embodiment of the method of the invention, the shielding modules are reciprocally superimposed in longitudinal direction for a portion having a predetermined length, preferably comprised between 25% and 100% of the width of the shielding element.

Preferably, the method of the invention further comprises the step of staggering, in each of the above-mentioned plurality of shielding modules, the modular base with respect to the modular cover in longitudinal direction by a predetermined distance.

According to a preferred embodiment of the method of the invention, in order to form curved sections, at least two adjacent shielding modules are laid along different directions, and are then connected by means of a respective connecting element made of ferromagnetic material.

When the cables are in number of three, the method of the invention preferably comprises the step of arranging such cables according to a trefoil arrangement, preferably of the closed type as described above.

Preferably, the above-mentioned step of leaning the cover onto the base of the shielding element comprises the step of superimposing the respective sides of the base and the cover for a portion of predetermined length in lateral direction.

According to a preferred embodiment, the method of the invention includes the step of coupling at least one supporting element also to the cover of the shielding element.

Preferably, the step of coupling the at least one supporting element to the base and optionally also to the cover of the shielding element includes the arrangement of the supporting element in a radially outer position with respect to the base and optionally also to the cover.

According to an alternative embodiment of the invention, the step of coupling the at least one supporting element to the base and optionally also to the cover of the shielding element includes the arrangement of the supporting element in a radially inner position with respect to the shielding element and optionally to the base.

According to a further alternative embodiment of the method of the invention, the step of coupling the at least one supporting element to the base and optionally also to the cover of the shielding element includes the interposition of the base and optionally also of the cover between a pair of respective supporting elements.

According to a preferred embodiment of the method of the invention, this further comprises the step of placing underground the electrical power transmission line.

Preferably, the method comprises the further step of arranging a plurality of fixing means, preferably in the form of hooks, longitudinally at predetermined distances from each other so as to fix the cover onto said base.

Preferably, such step of arranging the fixing means includes the arrangement of the fixing means in pairs, wherein each pair comprises fixing elements arranged on opposite sides with respect to the longitudinal axis of the shielding element.

Preferably, such hooks are arranged in a plurality of pairs positioned along the sides of the shielding element at a predetermined reciprocal longitudinal distance, comprised between about 20 and about 100 cm.

BRIEF DESCRIPTION OF THE DRAWINGS

Additional features and advantages of the invention will become more readily apparent from the description of some embodiments of a method for shielding the magnetic field generated by an electrical power transmission line according to the invention, made in the following with reference to the attached drawing figures in which, for illustrative and non-limiting purposes, an electrical power transmission line so shielded is shown.

In the drawings.

DETAILED DESCRIPTION OF THE PREFERRED EMBODIMENTS

Figure 1:
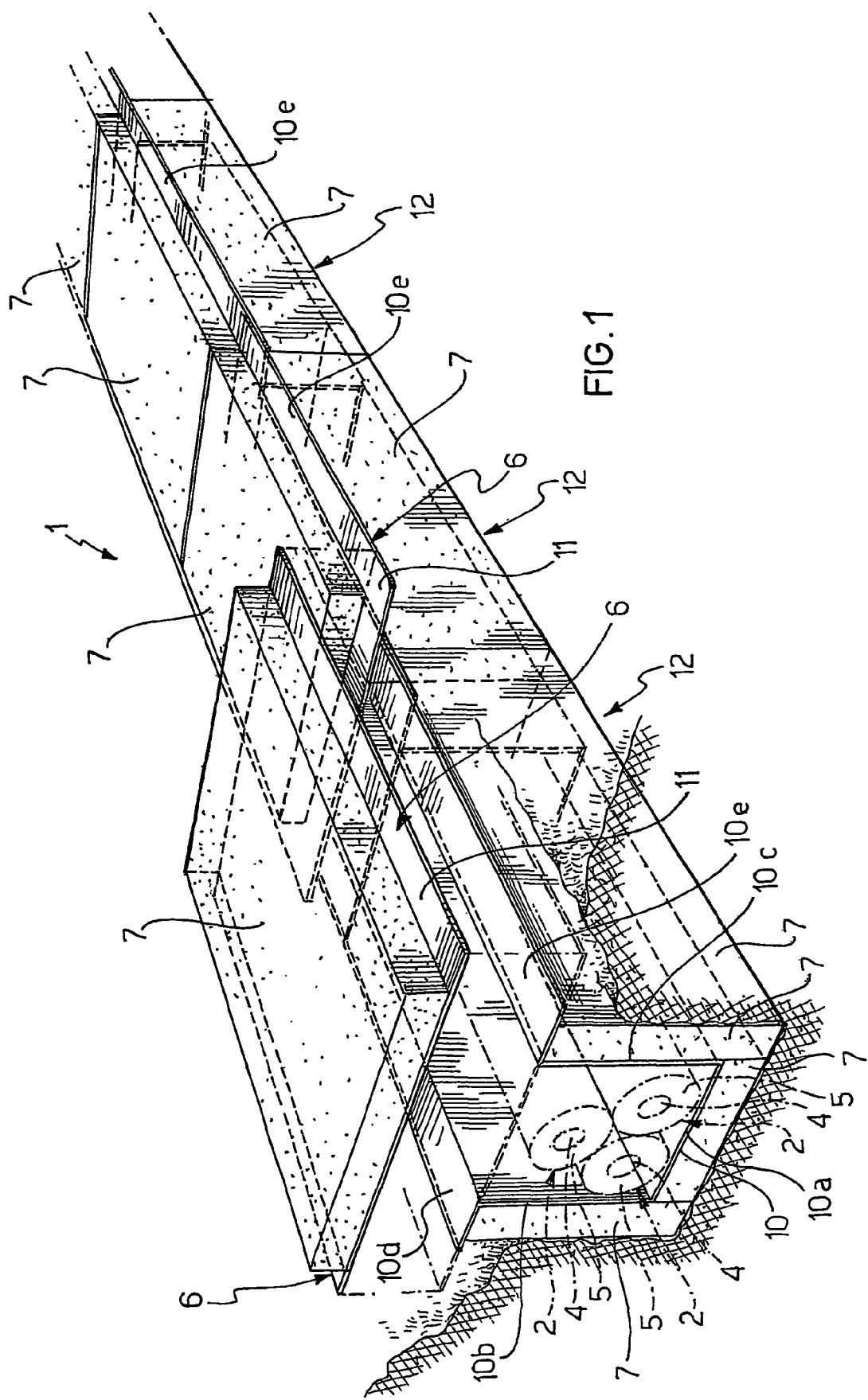
FIG. 1 is a perspective view of an electrical power transmission line shielded according to a first preferred embodiment of the invention.
Figure 2:
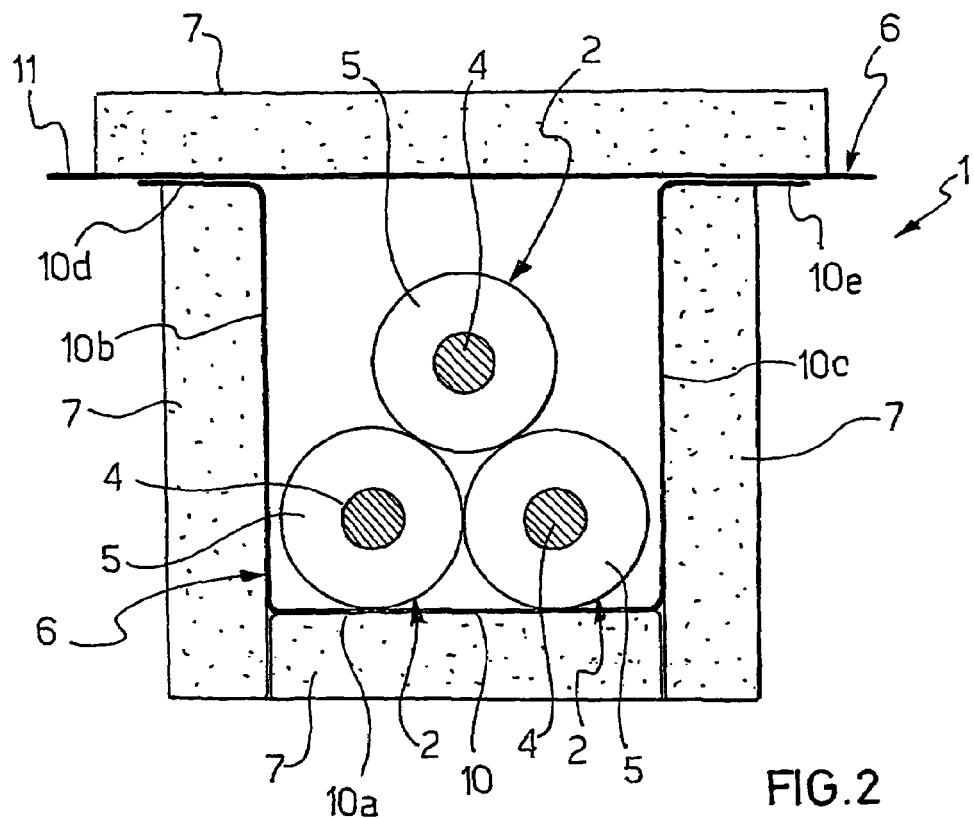
FIG. 2 is a cross-sectional view of the line shown in FIG. 1.
Figure 3:
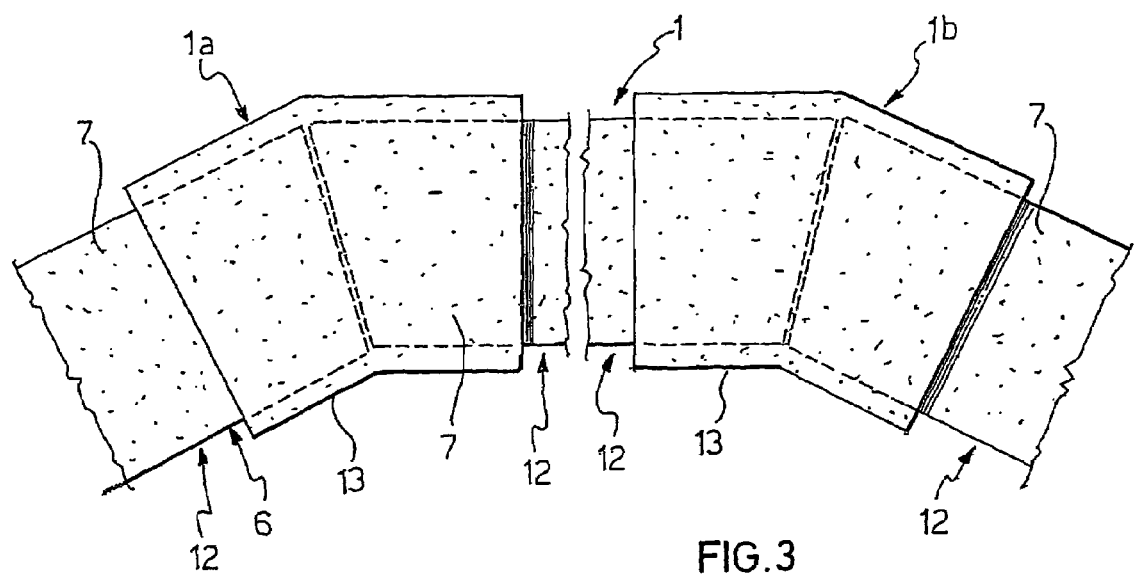
FIG. 3 is a top view of two curved sections of the line of FIG. 1.

With reference to FIGS. 1-3, an electrical power transmission line in accordance with a first preferred embodiment according to the invention is generally indicated with 1.

The line 1 shown in the above-mentioned figures is intended to transmit high voltage three phase electrical power, for example equal to about 132 kV, and is able to carry currents up to about 860 A. In particular, the line 1 shown in the above-mentioned figures is intended to operate with a current of about 400 A. The line 1 is particularly adapted to be placed underground.

According to the illustrated preferred embodiment, the line 1 comprises three electrical cables, all indicated by 2, and a shielding element 6 made of ferromagnetic material, such as for example grain oriented silicon steel referred to as M4T27 according to the AST standard. Such material has a maximum value of relative magnetic permeability $\mu_{max}$ equal to about 40000 and a silicon content equal to about 3%.

Alternatively, any material having a maximum value of relative magnetic permeability $\mu_{max}$ comprised between about 20000 and about 60000, for example a non-grain oriented silicon steel, a Permalloy® alloy or a Supermalloy® alloy, or similars could be used.

The shielding element 6 is arranged in a radially outer position with respect to the cables 2 in such a manner as to surround the cables 2 and to mitigate the magnetic field generated thereby.

The cables 2 are intended to carry an alternating current at a frequency typically equal to 50 or 60 Hz, and are arranged in contact with each other according to a trefoil arrangement of the closed type, which is particularly advantageous in terms of reduction of the magnetic field generated by the cables 2. Alternatively, the cables 2 may be aligned on the bottom of the shielding element 6, although this alternative arrangement, not illustrated, could increase the magnetic field generated by the cables 2.

According to the preferred embodiment shown in the above-mentioned figures, each of the cables 2 comprises, starting from a radially inner position to a radially outer position, a conductor 4, for example an enameled copper Milliken conductor, and a radially outer construction, schematically illustrated and identified by 5, which preferably includes an inner semiconductor layer, a layer of extruded polymeric insulator, for example constituted by cross-linked polyethylene (XLPE), an outer semiconductor layer, a metallic shield and an outer sheath, not illustrated in detail. The Milliken conductor may have, for example, a cross-sectional area equal to about 1600 mm². The total outer diameter of each cable 2 is preferably comprised between about 40 and about 160 mm, for example equal to about 100 mm.

The trefoil of cables 2 may be raised by means of suitable shims from the bottom of the shielding element 6 to a position which is closer to the geometrical centre of such element, which position is more favourable in terms of mitigation of the magnetic field.

According to the preferred embodiment illustrated in FIG. 1, the shielding element 6 comprises a plurality of shielding modules 12 arranged side by side and partially superimposed in longitudinal direction. Each shielding module 12 comprises a modular base 10 and a modular cover 11 and is coupled to respective substantially flat supporting elements 7.

In particular, the shielding modules 12 are reciprocally longitudinally superimposed for a portion of predetermined length, for example equal to at least 25% of the width of the shielding element 6.

Moreover, in each of the shielding elements 12, the modular base 10 and the modular cover 11 are reciprocally staggered in longitudinal direction by a predetermined distance, for example equal to 25% of the width of the shielding element 6.

In the preferred embodiment illustrated in FIGS. 1 and 2, each modular base 10 and each modular cover 11 of the shielding element 6 comprise respective sides reciprocally superimposed for a portion of predetermined length in lateral direction. In each shielding module 12, the modular base 10 and the modular cover 11 may be manufactured starting from folded sheets, which are obtained starting from M4T27 steel strips previously subjected to rolling and thermal treatments intended to obtain the orientation of the grams.

Each modular base 10 comprises in particular a bottom wall 10*a* and a pair of side walls 10*b*, 10*c* extending in a direction substantially perpendicular to the bottom wall 10*a*.

Moreover, according to the preferred embodiment illustrated in FIGS. 1 and 2, each modular base 10 further comprises a pair of flanges 10*d*, 10*e* outwardly extending in a direction substantially perpendicular to the end portions of the side walls 10*b*, 10*c* of the base 10.

The above-mentioned walls 10*a*, 10*b* and 10*c* of each modular base 10 are arranged in such a manner that the respective rolling direction to which the walls have been subjected is substantially perpendicular to the axis of the cables 2.

Each modular cover 11 is substantially flat and, in the preferred embodiment illustrated in FIG. 2, for reasons of simplicity of construction, protrudes with respect to the flanges 10*d*, 10*e* of the modular bases 10. Alternatively, each modular cover 11 may be advantageously terminated flush with the flanges 10*d*, 10*e* of the modular base 10, because in the coupling between the flanges 10*d*, 10*e* of the modular base 10 and the modular cover 11 it is the width of the superimposed lateral portions which affects the mitigation of the magnetic field, whereas the portion of the cover 11 possibly protruding with respect to the sides of the base 10 does not have any effect in such sense.

Figure 4:
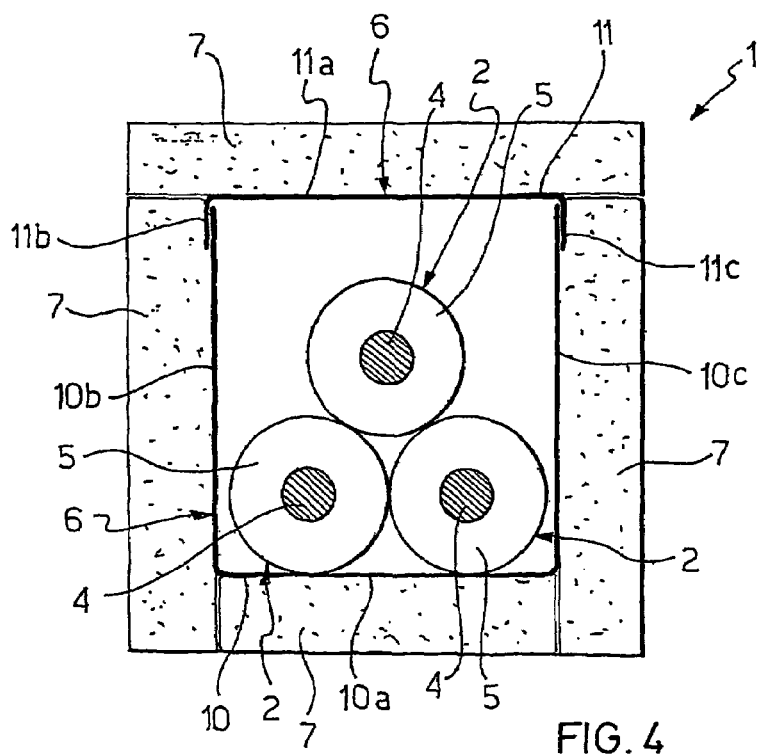
FIG. 4 is a cross-sectional view of a second preferred embodiment of the electrical power transmission line according to the invention.

In FIG. 4, in which an alternative embodiment of the line of the invention is shown, the line elements which are structurally or functionally equivalent to those previously illustrated with reference to the line 1 illustrated in FIG. 1 will be indicated by the same reference numerals and will not be further described. According to such alternative embodiment, the base 10 comprises a bottom wall 10*a* and a pair of side walls 10*b*, 10*c* extending in a direction substantially perpendicular to the bottom wall 10*a*, while the cover 11 comprises a main wall 11*a* and a pair of flanges 11*b*, 11*c* extending in a direction substantially perpendicular to the main wall.

FIG. 3 shows two curved sections 1*a*, 1*b* of the line 1 of FIG. 1, each section comprising a pair of adjacent shielding modules 12. The adjacent shielding modules 12 belonging to each of such pairs extend in different directions. In particular, the bases 10 are shaped in such a manner that the sides placed side by side of the bases 10 belonging to adjacent shielding modules 12 are substantially parallel, so as to minimize the free space between adjacent shielding modules 12.

In such case, the shielding element 6 further comprises two connecting elements 13 made of ferromagnetic material, for example of the same steel indicated above, for connecting respectively the adjacent shielding modules 12 of the two pairs.

In the preferred embodiment shown in FIGS. 1 and 2, in each shielding module 12, the supporting elements 7 are in number of four, one for each of the above-mentioned walls 10*a*, 10*b*, 10*c* of the base 10 and for the cover 11.

Alternatively, instead of three separate supporting elements 7, an integral supporting element 7, preferably made by extrusion and able to simultaneously support the three walls 10*a*, 10*b*, and 10*c* may be coupled to the base 10.

The supporting elements 7 according to the preferred embodiment shown in FIGS. 1 and 2 are arranged in a radially outer position with respect to the shielding element 6.

Figure 5:
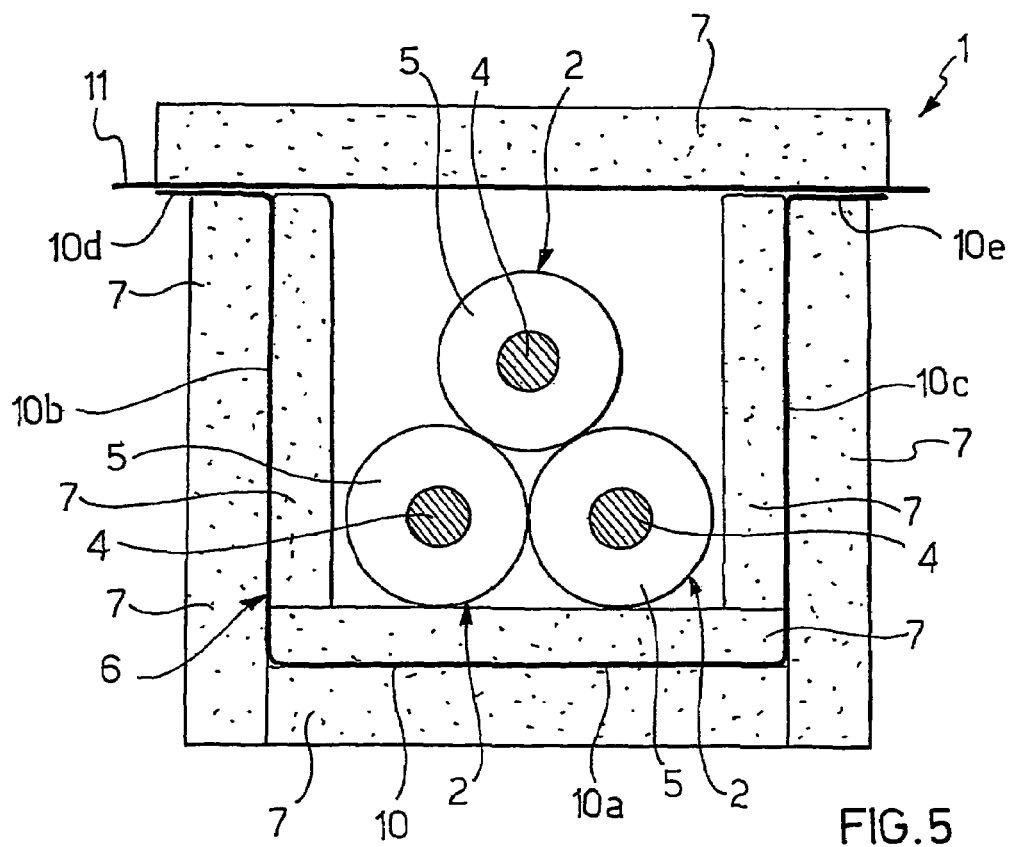
FIG. 5 is a cross-sectional view of a further preferred embodiment of the electrical power transmission line according to the invention.

However, in an alternative embodiment (not shown), the supporting elements 7 may be arranged in a radially inner position with respect to the shielding element 6. According to a further alternative embodiment, shown in FIG. 5, in each shielding module 12 the base 10 of the shielding element 6 is interposed between a pair of supporting elements 7.

Figure 7:
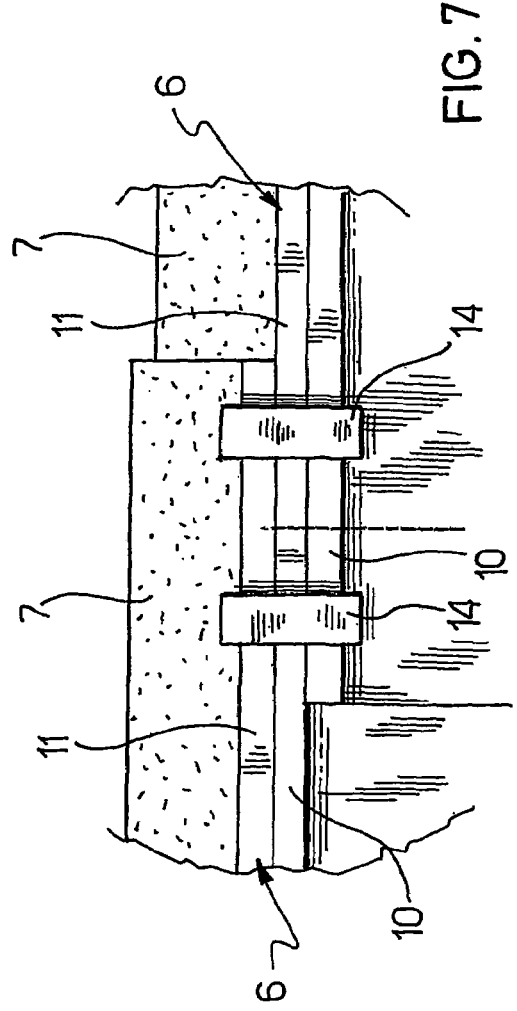
FIG. 7 is an enlarged view of the detail marked with a circle in FIG. 6.
Figure 6:
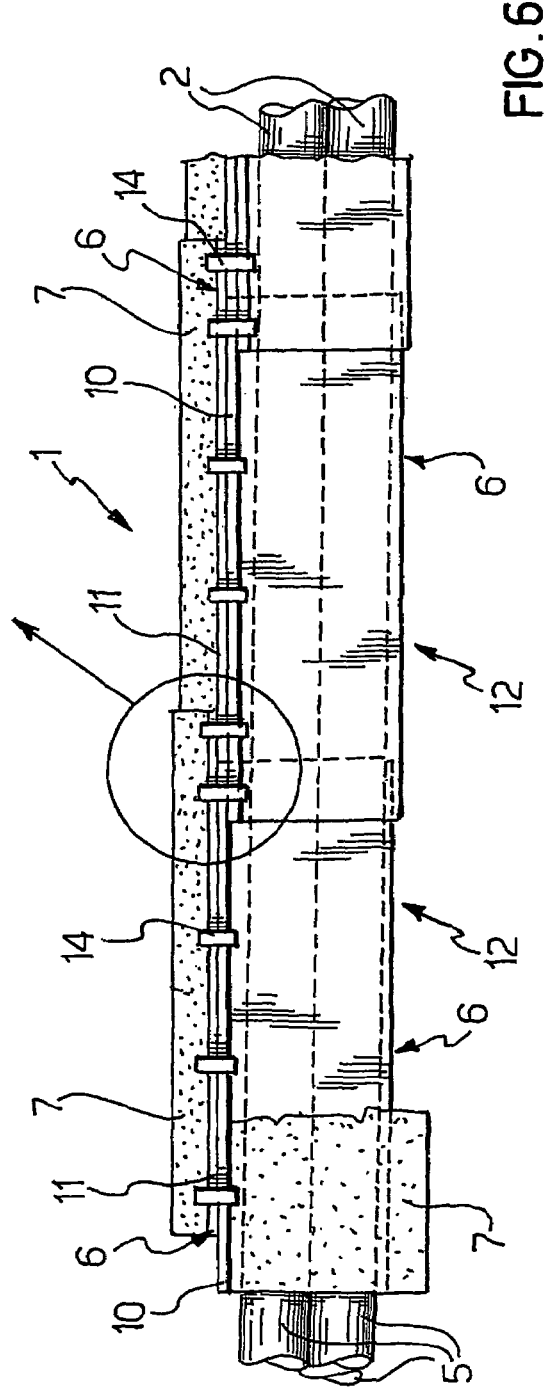
FIG. 6 is a side view, in partial cross-section, of a further preferred embodiment of the electrical power transmission line according to the invention.

According to the preferred embodiment shown in FIGS. 6 and 7, the shielding element 6 further comprises fixing means, for example in the form of hooks 14, arranged in a plurality of pairs positioned along the sides of the shielding element 6 at a predetermined longitudinal distance from each other, which fixing means are intended to fix the cover 11 onto the base 10 of each shielding module 12.

With reference to the embodiment of the electrical power transmission line described above, a preferred embodiment of the method according to the invention for shielding a line of such type involves the following steps.

According to a first step of the method, the shielding element 6 comprising the above-mentioned plurality of shielding modules 12 made of grain oriented silicon steel M4T27 is provided.

In a second step, the walls 10*a*, 10*b* and 10*c* of the base 10 and the cover 11 of each shielding module 12 are coupled to the respective supporting elements 7 arranging the latter in a radially outer position with respect to the shielding module 12. Such coupling is previously carried out for example by gluing.

Each modular base 10 is shaped according to a U-shaped cross-section provided with lateral flanges 10*d*, 10*e* preferably by longitudinally hot-bending the base 10 and the respective three supporting elements 7 coupled thereto at four points.

The modular bases 10 of the shielding modules 12, so coupled to the respective supporting elements 7, are then placed in the trench and partially longitudinally superimposed.

The walls 10*a*, 10*b* and 10*c* of the base 10 are preferably arranged according to such a configuration that, after having laid the cables into the base 10, as will be explained in more detail in the following, the rolling direction of the walls is substantially perpendicular to the axis of the cables 2.

In a further step of the method, the electrical cables 2 are laid into the modular bases 10 so assembled of the shielding element 6 after fixation of the cables 2 in the desired trefoil arrangement of the closed type.

Subsequently to the step of laying the electrical cables 2 into the bases 10, a preferred embodiment of the method of the invention involves the further step of inserting a filing material, such as for example cement (not shown in the figure), in the bases 10.

Subsequently, in each shielding module 12, the cover 11, coupled to the respective supporting element 7, is leaned onto the base 10 by superimposing respective sides of the base 10 and of the cover 11 so as to substantially close the shielding element 6.

In particular, in each shielding module 12, the cover 11 is staggered with respect to the base 10 in longitudinal direction by a predetermined distance.

With reference to the two curved sections 1a, 1b of FIG. 3, these may be manufactured by extending, for two pairs of adjacent shielding modules 12, the adjacent modules 12 belonging to each pair in different directions and by connecting the same by means of the respective connecting element 13.

Finally, the hooks 14 are longitudinally arranged in a plurality of pairs positioned along the sides of the shielding element 6 at a predetermined longitudinal distance from each other in order to fix the covers 11 onto the respective bases 10.

Figure 8:
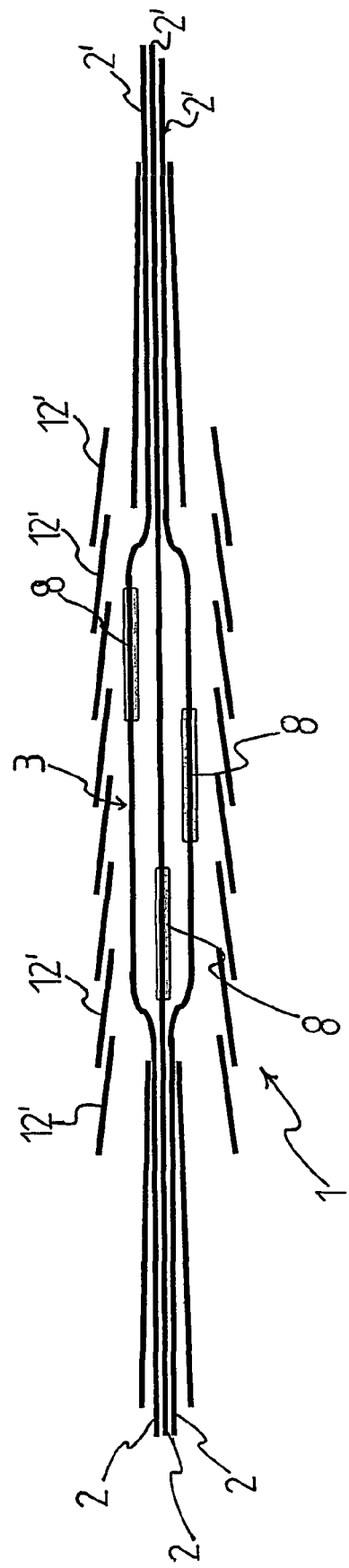
FIG. 8 is a schematic top view of a further preferred embodiment of the electrical power transmission line according to the invention.

FIG. 8 shows a further embodiment of the line of the invention: the line elements which are structurally or functionally equivalent to those illustrated previously with reference to the line 1' shown in FIG. 1 will be indicated by the same reference numerals and will not be further described. In particular, such figure shows an electrical power transmission line 1 comprising a joining portion 3 of the cables of said line. According to the embodiment shown in FIG. 8, the joining portion 3 of the line 1 comprises in particular three cables 2 joined with a same number of cables, all indicated by 2', by means of respective joints 8. A plurality of shielding modules 12', made for example of grain oriented silicon steel, having a frustoconical longitudinal section and reciprocally longitudinally superimposed, is arranged at the joining portion 3 of the line 1, which is wider in size than the other portions of the line 1. The shielding modules 12' arranged in the joining portion 3 of the line 1 are wider than the shielding modules 12 arranged in the other portions of the line 1, the modules 12 being preferably made of grain oriented silicon steel as well.

Thanks to such measure, it is advantageously possible to shield also those portions of the line which are wider in size, while allowing—thanks to the modular type configuration—to facilitate the transport and laying operations of the line.

Considering the effectiveness of the mitigation effect of the magnetic field ensured by the shielding modules 12 and 12', a possible superimposition of layers of shielding material in each module 12, 12' would not cause substantial effects in terms of reduction of the magnetic field: as a consequence, it is preferable that, in the region of superimposition of two adjacent shielding modules, the ferromagnetic material is provided only on one of the two modules instead of on both modules, with advantageous lower consumption of ferromagnetic material.

EXAMPLE 1

Invention

The Applicant manufactured an electrical power transmission line comprising three 150 kV electrical cables, having a section equal to about 1000 mm$^2$ and a diameter equal to about 92 mm, arranged according to a trefoil arrangement of the closed type, and a shielding element comprising 5 modules, each of said modules comprising a modular base and a modular cover.

The shielding element was made of grain oriented silicon steel starting from a strip having a width of 470 mm and a thickness of 0.27 mm In particular, the steel referred to as M4T27 according to the AST standard was used. For each module, a steel strip was cut into rectangular sheets (460 mm×690 mm) and subsequently folded by means of a manual bending apparatus to form a modular base comprising a 190 mm wide substantially flat bottom wall, a pair of substantially flat side walls (200 mm long) extending in a direction substantially perpendicular to the bottom wall, and a pair of substantially flat flanges (50 mm wide) outwardly extending in a direction substantially perpendicular to the end portions of the side walls of the modular base.

The corners between the modular base and the side walls were not bevelled (sharp corners).

The walls of the modular base were provided according to a configuration such that, after the cables have been laid into the modular base as will be explained in the following, the rolling direction of the walls of the modular base was perpendicular to the cable axis.

Subsequently, rectangular sheets measuring 470 mm×450 mm were cut to form the modular covers.

The modular bases and covers were painted to protect the steel from corrosion by means of a layer of epoxy paint having a thickness of about 100 µm, which is capable of protecting the steel for long periods of useful life.

20 sheets of 40 mm thick expanded polyester which is advantageously workable in an easy and inexpensive manner, were provided to form a same number of supporting elements.

The modular bases and covers were coupled to respective supporting elements formed in this manner by gluing the latter to the bases and to the covers.

The modular bases coupled to the respective supporting elements and longitudinally superimposed for a portion of length of about 50 mm were placed in a trench at a depth of 1.4 m.

Subsequently, the three cables were laid into the modular bases assembled in this manner after fixation of the cables in the desired trefoil arrangement of the closed type by means of shims made of expanded polystyrene interposed between the modular bases and the cables.

The modular covers, coupled to the respective supporting elements, were then leaned onto the above-mentioned modular bases assembled in this manner by staggering, with reference to each shielding element, the modular cover by 50 mm with respect to the corresponding modular base in order to substantially close the shielding element and, in this manner, to improve the shielding effectiveness thereof. For the same purpose, the covers were also reciprocally longitudinally superimposed of 50 mm.

In order to simulate a defective coupling, which can occur due to defects in the bases and/or in the covers (which may not be perfectly flat) or due to the penetration of earth between the flanges of the bases and the covers, a gap of about 3 mm was deliberately left between the flanges of the bases and the covers.

Finally, along the sides of the shielding element assembled in this manner, 8 plastic hooks (4 for each side) were longitudinally positioned in the region in which the bases and the covers were superimposed, and 6 hooks (3 for each side) were longitudinally positioned in the other regions, so as to ensure a mechanical strength between the base and the cover in the order of about 1-10 kg for each metre of shielding element.

In such manner, a shielding element with a width of 190 mm and a height of 200 mm, capable of housing three cables, was manufactured.

The electrical power transmission line manufactured in this manner was 6 metres long.

A set of weights was positioned above the covers in order to simulate the effect of mechanical crushing exerted, in normal working conditions of the line, by the layer of earth standing above the line.

The cables were connected, at one end, to a plant capable of supplying a symmetrical three phase current up to 1000 A and, at the other end, the cables were short-circuited one to each other. A symmetrical three phase electrical current was circulated through the cables at an increasing intensity up to 800 A.

EXAMPLE 2

Comparison

A non-shielded electrical power transmission line comprising three electrical cables arranged according to a trefoil arrangement, laid in a trench at a depth of 1.4 metres, having the same constructive characteristics and subject to the same working conditions of the cables of the shielded line described in Example 1 was manufactured.

EXAMPLE 3

Invention

An electrical power transmission line as described in Example 1, except for the fact that the covers were arranged with the axis of the grains oriented in the direction parallel to the cable axis, was manufactured.

EXAMPLE 4

Invention

An electrical power transmission line as described in Example 1, except for the fact that the base was shaped so as to have a U-shaped cross-section with bevelled corners defined between the bottom wall and the side walls, was manufactured. In particular, such corners were bevelled according to a bending radius approximately equal to half the outer diameter of the cables in order to preserve the ferromagnetic material from degradation of the magnetic characteristics, degradation which occurs in consequence of a bending step giving a base having sharp corners.

Experimental Measures

The maximum value of magnetic field $B_{max}$ generated at ground level by the electrical power transmission line of Examples 1-4 was measured according to a measuring method essentially consisting of positioning a measuring sensor at ground level (i.e. at 1.4 m from the line), measuring the radial and circumferential components of the magnetic induction, and finally calculating the modulus of the maximum value of magnetic induction starting from such components, as is described in patent application WO 03/003382. Such measuring method was in particular carried out by means of a measuring device comprising a measuring sensor which is horizontally and vertically movable, so as to be positionable at a predetermined distance from the line, namely at ground level, as described in the above-mentioned patent application.

Figure 9:
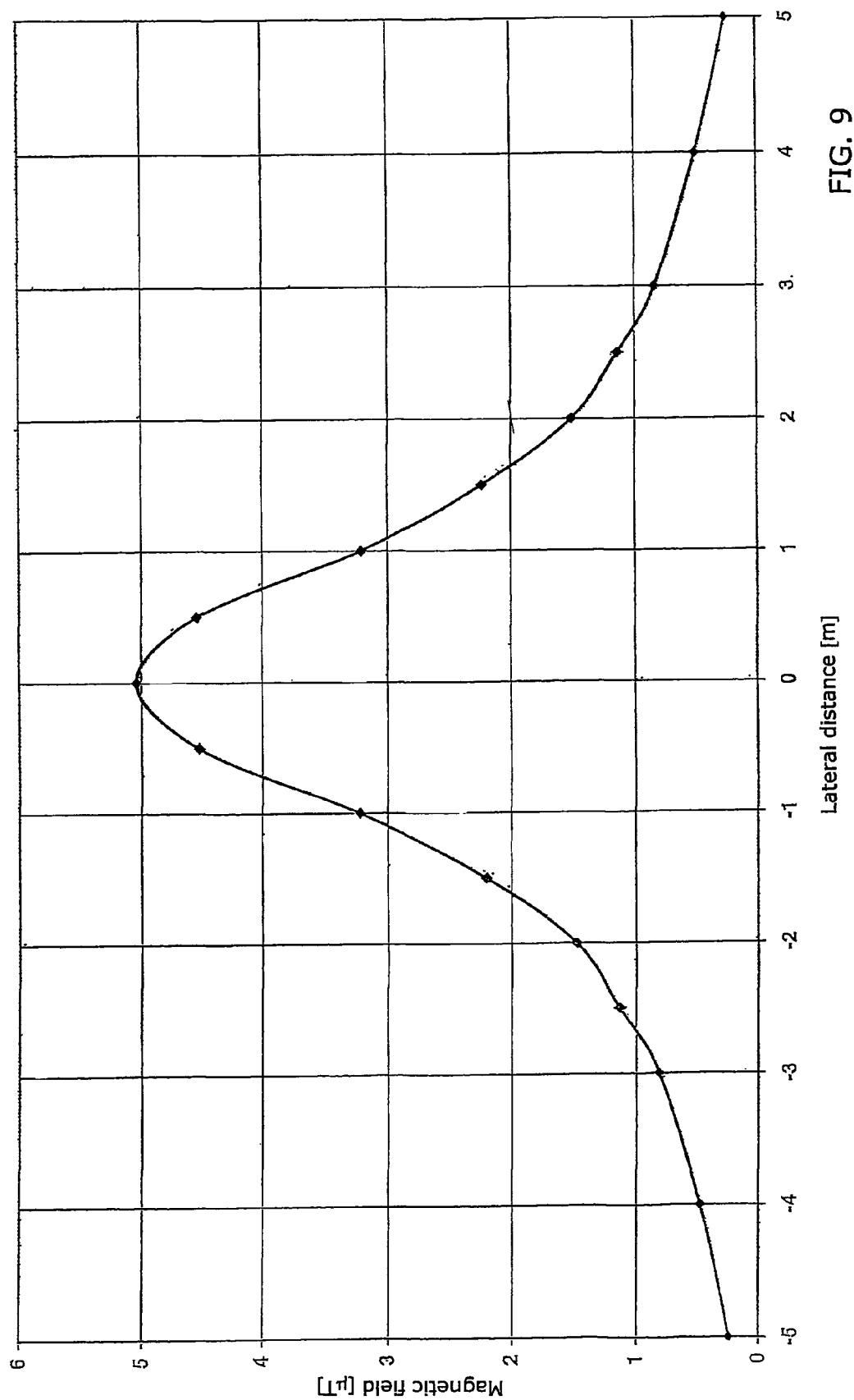
FIGS. 9-11 show results of experimental tests.
Figure 10:
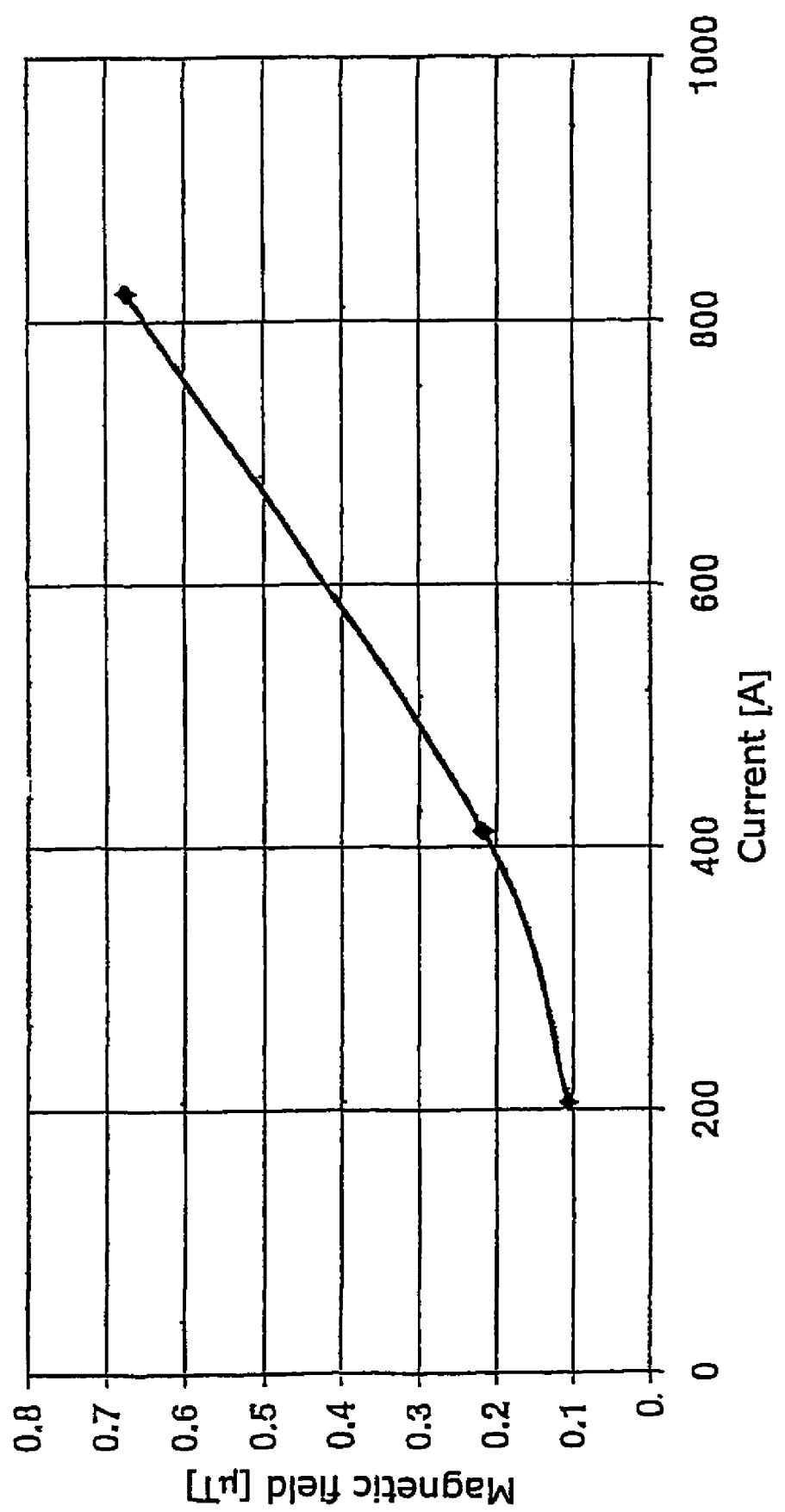
Figure 11:
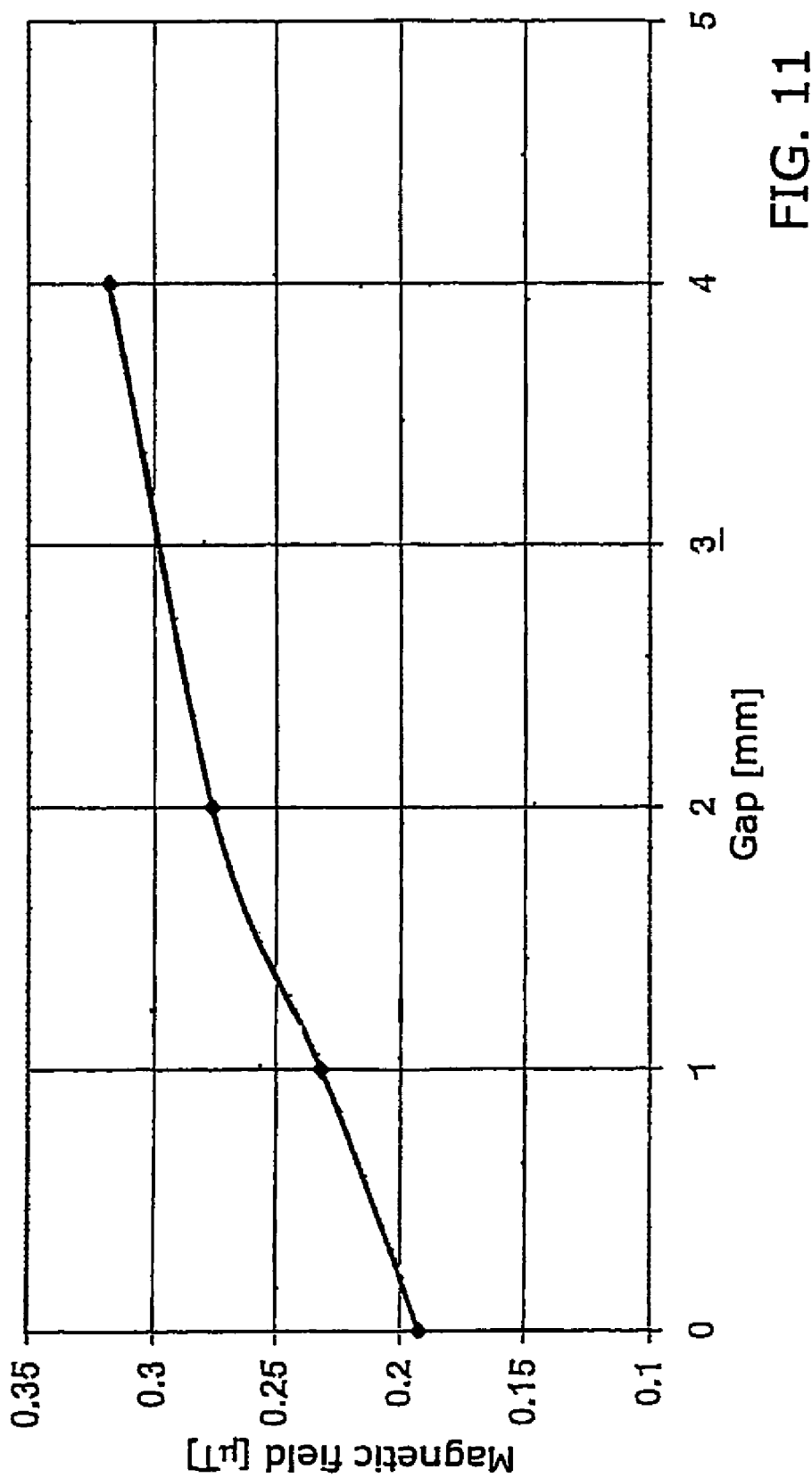

The measurements performed are shown in FIGS. 9, 10, and 11.

FIG. 9 is a graph showing the experimental measurements of the magnetic field performed in the case of the non-shielded electrical power transmission line of Example 2, operating at a current of 400 A. As shown in such figure, the experimental measurements revealed that the maximum value of magnetic field $B_{max}$ at ground level without shielding protection, as described in Example 2, was equal to 5.04 µT.

FIG. 10 is a graph showing the tendency of the magnetic field measured at ground level as a function of the current circulating in the cables of the shielded electrical power transmission line of Example 1. As shown in FIG. 10, the experimental measurements revealed that the maximum value of magnetic field $B_{max}$ at ground level in the presence of a shielding according to the invention as described in Example 1, by circulating a symmetrical three phase electrical current having an intensity equal to 400 A in the cables, was equal to 0.20 µT.

Therefore, the mitigation of the magnetic field in a shielded line according to the present invention is about 25 times lower than the magnetic field generated by a similar non-shielded line.

Moreover, as can be seen in FIG. 10, the value of the magnetic field increases rather rapidly for currents higher than 400 A, since the M4T27 steel employed in the experimental tests is optimized for a current of 400 A and above this value the magnetic permeability thereof is lower than the maximum magnetic permeability.

FIG. 11 is a graph showing the tendency of the magnetic field value generated by the cables of the electrical power transmission line shielded according to Example 1 as a function of the gap deliberately left between the flanges of the bases and the covers. As can be seen in said figure, as the gap between the flanges of the bases and covers increases, the ensuing increase of the magnetic field is substantially limited thanks to the arrangement of the shielding element of the invention.

In the case of the line of Example 3, i.e. in the case of covers arranged with the axis of the grain oriented in parallel direction to the axis of the cables, the magnetic field, at a current of 400 A, was equal to 0.6 µT at ground level, i.e. about three times higher than the magnetic field obtained with the covers having the grains oriented perpendicularly to the cable axis.

Moreover, the experimental measurements performed demonstrated that in the case of the line of Example 4, all other conditions being equal, the magnetic field at ground level was about 25% higher than the magnetic field found in the case of the line of Example 1, comprising a base having sharp corners. In other words, the increase of the extension of the bent surface due to the bevelling of the above-mentioned corners exerts a negative effect having a greater role on the attenuation of the magnetic field with respect to the role exerted by the degradation of the characteristics of the material in consequence of a bending step giving a base having sharp corners.

The invention claimed is:

1. An electrical power transmission line comprising:
   at least one electrical cable;
   at least one shielding element comprising a plurality of shielding modules arranged side by side, each shielding module made of at least one ferromagnetic material arranged in a radially outer position with respect to said at least one cable for shielding the magnetic field generated by said cable, each of said plurality of shielding modules comprising a base and a cover, the base comprising a bottom wall, a pair of side walls, and a pair of flanges integral with the base and extending in a predetermined direction from the end portions of the side walls; and
   at least one supporting element coupled to at least one of said bases.

2. The electrical power transmission line according to claim 1, wherein said at least one cable comprises three cables arranged according to a trefoil arrangement.

3. The electrical power transmission line according to claim 1, wherein said line is placed underground.

4. The electrical power transmission line according to claim 1, wherein said base and said cover are substantially continuous.

5. The electrical power transmission line according to claim 1, wherein said bottom wall and said pair of side walls are substantially flat.

6. The electrical power transmission line according to claim 1, wherein said side walls extend in a direction substantially perpendicular to said bottom wall.

7. The electrical power transmission line according to claim 1, wherein said flanges extend outwardly from the end portions of the side walls of the base.

8. The electrical power transmission line according to claim 1, wherein said flanges extend in a direction substantially perpendicular to the end portions of the side walls of the base.

9. The electrical power transmission line according to claim 1, wherein said cover is substantially continuous.

10. The electrical power transmission line according to claim 9, wherein said cover comprises a main wall and a pair of flanges extending from the main wall in a predetermined direction.

11. The electrical power transmission line according to claim 10, wherein said flanges extend in a direction substantially perpendicular to said main wall.

12. The electrical power transmission line according to claim 1, wherein said base and said cover comprise walls having a thickness of about 0.20 mm to about 0.35 mm.

13. The electrical power transmission line according to claim 1, wherein said base and said cover comprise respective sides superimposed for a portion of predetermined length in lateral direction.

14. The electrical power transmission line according to claim 1, wherein said shielding modules are longitudinally superimposed for a portion of predetermined length.

15. The electrical power transmission line according to claim 14, wherein said predetermined length is 25% to 100% of the width of said shielding element.

16. The electrical power transmission line according to claim 1, further comprising a respective connecting element made of ferromagnetic material for connecting said shielding modules arranged side by side.

17. The electrical power transmission line according to claim 1, wherein, in each of said shielding modules, said base and said cover are reciprocally staggered in longitudinal direction by a predetermined distance.

18. The electrical power transmission line according to claim 1, wherein, in each of said shielding modules, said base is coupled to a respective supporting element.

19. The electrical power transmission line according to claim 1, wherein at least two adjacent shielding modules extend along different directions, said shielding element further comprising a respective connecting element made of ferromagnetic material for connecting said at least two adjacent shielding modules.

20. The electrical power transmission line according to claim 1 or 19, wherein said ferromagnetic material has a maximum value of relative magnetic permeability greater than about 20000.

21. The electrical power transmission line according to claim 1 or 19, wherein said ferromagnetic material has a maximum value of relative magnetic permeability $\mu_{max}$ of about 20000 to about 60000.

22. The electrical power transmission line according to claim 1 or 19, wherein said ferromagnetic material is selected from the group of: grain oriented silicon steel, nickel-iron magnetic alloy, nickel-molybdenum-iron alloy, and non-grain oriented silicon steel.

23. The electrical power transmission line according to claim 22, wherein the silicon content is about 1% to about 5%.

24. The electrical power transmission line according to claim 1, wherein, in each of said shielding modules, said base is made of a first ferromagnetic material having a maximum value of relative magnetic permeability $\mu_{max}$ greater than about 40, and wherein said cover is made of a second ferromagnetic material having a maximum value of relative magnetic permeability $\mu_{max}$ greater than about 20.

25. The electrical power transmission line according to claim 1, further comprising a supporting element coupled to at least one of said covers.

26. The electrical power transmission line according to claim 1 or 25, wherein said at least one supporting element is arranged in a radially outer position with respect to said at least one shielding element.

27. The electrical power transmission line according to claim 1 or 25, wherein said at least one supporting element is arranged in a radially inner position with respect to said at least one shielding element.

28. The electrical power transmission line according to claim 1 or 25, wherein at least one of said plurality of shielding modules is interposed between a pair of supporting elements.

29. The electrical power transmission line according to claim 1 or 25, wherein said at least one supporting element is substantially flat.

30. The electrical power transmission line according to claim 1 or 25, wherein said at least one supporting element comprises a respective wall having a thickness of about 1 to about 20 mm.

31. The electrical power transmission line according to claim 1 or 25, wherein said at least one supporting element is made of an electrically non-conductive and non-ferromagnetic material.

32. The electrical power transmission line according to claim 31, wherein said electrically non-conductive and non-ferromagnetic material is selected from the group of: plastics materials, cement, terracotta, carbon fibres, glass fibres, and wood.

33. The electrical power transmission line according to claim 32, wherein said plastics materials are selected from the group of: polyethylene (PE), low-density polyethylene (LPDE), medium-density polyethylene (MPDE), high-density polyethylene (HPDE), linear low-density polyethylene (LLPDE), polypropylene (PP), ethylene/propylene elastomer copolymers (EPM), ethylene/propylene/diene terpolymers (EPDM), natural rubber, butyl rubber, ethylene/vinyl copolymers, ethylene/acrylate copolymers, ethylene/α-olefin thermoplastic copolymers, polystyrene, acrylonitrile/butadiene/styrene resins (ABS), halogenated polymers, polyurethane (PUR), polyamides, aromatic polyesters.

34. The electrical power transmission line according to claim 1, wherein said shielding element further comprises a plurality of fixing means longitudinally arranged at predetermined distances from each other, said fixing means being intended to fix said covers on said bases.

35. The electrical power transmission line according to claim 34, wherein said fixing means are arranged in a plurality of pairs positioned along the sides of the shielding element at a reciprocal longitudinal distance of about 20 to about 100 cm.

36. A method for shielding the magnetic field generated by an electrical power transmission line comprising at least one electrical cable, comprising the following steps of:

provide at least one shielding element comprised of a plurality of shielding modules arranged side by side, each shielding module made of at least one ferromagnetic material for shielding the magnetic field generated by at least one electrical cable, each of said shielding modules comprising a base and a cover, the base comprising a bottom wall and a pair of side walls, the cover comprising a main wall, and either the base comprising a pair of integral flanges extending in a predetermined direction from the end portions of the side walls or the cover comprising a pair of integral flanges extending in a predetermined direction from the end portions of the main wall;

coupling at least one supporting element to at least one of said bases;

laying said at least one electrical cable into said bases; and leaning said covers onto said bases so as to substantially close said shielding element.

\* \* \* \* \*